July 29, 1941.  G. ALGARSSON  2,250,695
SYNCHRONIZING MECHANISM FOR AIRCRAFT ENGINES
Filed Feb. 7, 1938    2 Sheets-Sheet 1

INVENTOR
GRETTIR ALGARSSON
BY
ATTORNEY

July 29, 1941.　　　　G. ALGARSSON　　　　2,250,695
SYNCHRONIZING MECHANISM FOR AIRCRAFT ENGINES
Filed Feb. 7, 1938　　　　2 Sheets-Sheet 2
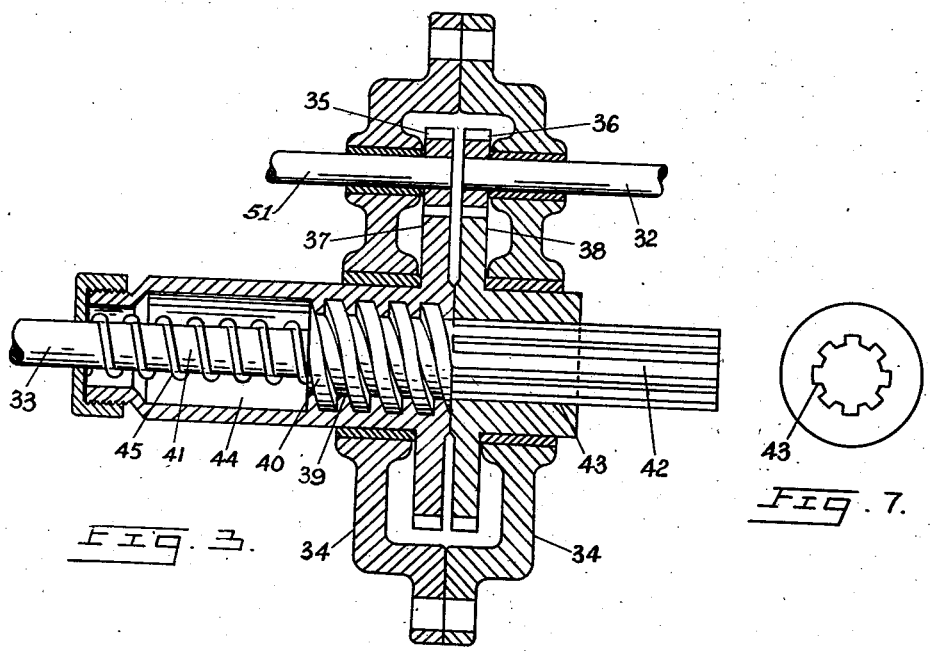
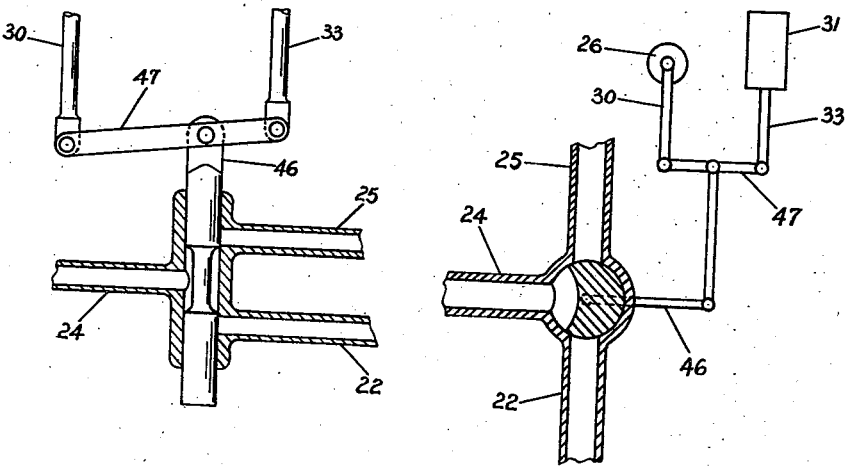
INVENTOR
GRETTIR ALGARSSON
By
ATTORNEY Patented July 29, 1941

2,250,695

UNITED STATES PATENT OFFICE 2,250,695

SYNCHRONIZING MECHANISM FOR AIRCRAFT ENGINES

Grettir Algarsson, Montreal, Quebec, Canada, assignor to Algarsson Engineering Company Limited, Montreal, Quebec, Canada Application February 7, 1938, Serial No. 189,021

11 Claims. (Cl. 60—97)

This invention relates to synchronizing mechanism for aircraft engines as described in the present specification and illustrated in the drawings forming a part of the same, and follows the subject of my co-pending application Serial Number 173,096, now Pat. No. 2,224,177 of Dec. 10, 1940.

The invention consists essentially in utilizing the lag in speed of any engine in a multi-engined aircraft behind the fastest engine to effect synchronization, as pointed out in the claims for novelty following a description in detail of one form of the invention.

One of the objects of this invention is to provide a synchronizing mechanism which can be employed in connection with existing controllable pitch airscrews.

A further object is to provide a synchronizing mechanism applicable to all varieties of controllable pitch airscrews, whether hydraulically, pneumatically, electrically or mechanically operated.

A further object is to provide a synchronizing mechanism which can be adapted to operate with either an individual governor for each engine or a single governor controlling all the airscrews simultaneously.

A further object is to provide a synchronizing mechanism which will apply the maximum available correction without deleterious effects on the mechanism in the event of such maximum correction being insufficient to effect synchronization.

A further object is to provide a synchronizing mechanism which will function correctly in association with whichever engine is the fastest regardless of the behaviour of the other engines.

In order to point out more clearly the novel features of the invention, reference is made to the accompanying drawings in which, Figure 1 is a diagrammatic showing of an installation employing two hydraulically operated controllable pitch airscrews each being fitted with a governor.

Figure 3 is a sectional view of a form of lag control for obtaining synchronization by adjusting the connection between the governor and the control valve shown in Figures 1 and 2.

Figure 4 is a sectional view of a piston type control valve controlling the flow of fluid to or from the airscrew and showing the operating connection with the governor and the manner in which movement of the lag control rod effects adjustment of such connection.

Figure 5 is a sectional view similar to Figure 4 but showing a rotary type valve.

Figure 7 is an end view of the gear sleeve showing the splines.

Figure 1:
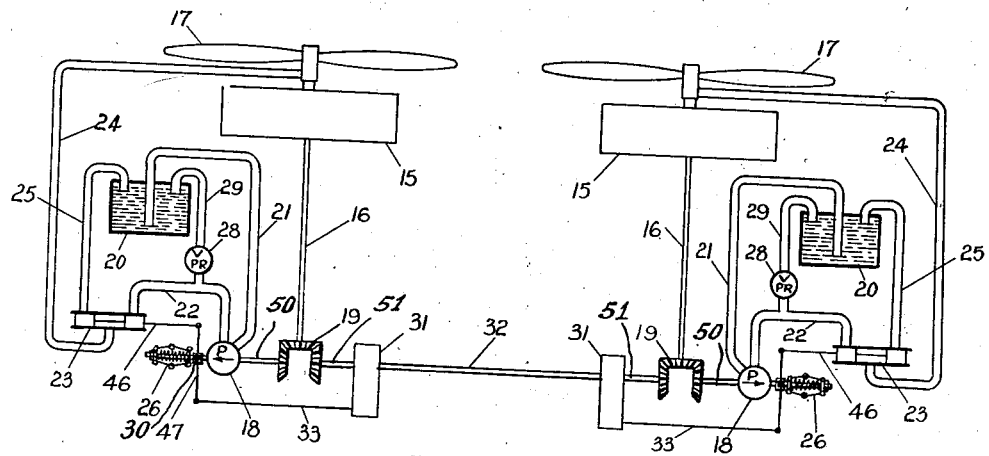
Figure 2:
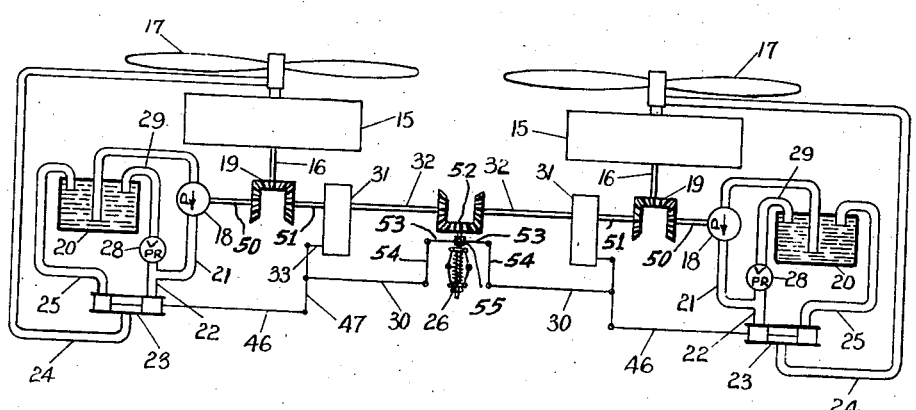
Figure 2 is a diagram similar to that shown in Figure 1 but fitted with a single governor controlling both airscrews.

Referring to the drawings, the application of the invention is shown diagrammatically in Figures 1 and 2 and is shown as applied to a twin engined installation. It will be readily understood that the invention could equally be applied to an installation having any number of engines.

In Figure 1 the engines 15 are shown as having their drive shafts 16 extended forwardly to carry the airscrews 17 and rearwardly to provide takeoffs 50 and 51 respectively for the governors and pump driving mechanism.

The airscrews 17 are of a controllable pitch type in which change of pitch is effected by hydraulic means. The pump 18 is driven by the engine through the gears 19, and draws fluid from the supply tank 20 through the pipe 21. The supply tank 20 could be the engine sump or a separate tank as illustrated. A pipe connection 22 leads to a valve 23 which has three controlled openings, one from the pump 18, one from the valve to the pipe 24 and the other to the pipe 25.

The pipe 24 leading from the valve 23 is connected directly with the airscrew 17. When the valve 23 has been moved into a position giving a clear connection between the pipe 22 and the pipe 24 fluid under pressure is transmitted from the pump 18 to the airscrew 17 and operates through mechanism therein, not shown, to decrease the pitch setting of the blades.

The third pipe 25 provides a return connection from the airscrew 17 to the supply tank 20. When the valve 23 has been moved into a position giving a clear connection between the pipe 24 and the pipe 25 the fluid is free to return from the airscrew to the supply tank 20.

The airscrew 17 contains further mechanism, not shown, of centrifugal or other nature, which, when the fluid pressure is relieved, turns the airscrew blades to a high pitch setting, thus expelling the fluid through the pipes 24 and 25 to the supply tank.

When the valve 23 is in the last mentioned position, that is, with a clear connection between pipes 24 and 25, the pipe 22 is closed and the oil passing through the pump 18 by-passes through the relief valve 28 and to the supply tank 20 through the pipe 29. The relief valve 28 is set to a predetermined pressure, its function being to maintain the pressure in the pipe 22 at the predetermined value whether the fluid is being passed to the airscrew 17 or by-passed to the supply tank 20.

The governor 26 may be of any suitable type and is here shown as driven from the gears 19 on the other side of the pump 18. The toggle arm 47 is directly connected at 30 with the governor and is connected with the rod 33 leading to the lag drive, on one side, and with the rod 46 controlling the valve 23 on the other side. Any other suitable means may be employed to transfer the movement of either or both of the rods 30 and 33 to the valve 23.

The lag drive 31 is shown in Figure 1 as connected with the drive shaft 16 through the gears 19.

All of the above described mechanism is duplicated for the other engine of the installation.

The lag drive 31 is illustrated in detail in Figure 3 of the drawings and comprises a split casing 34 in which are journalled the shaft driven by gear 19 and the synchro-drive shaft 32. Both of these shafts 51 and 32 terminate in gears 35 and 36.

Also journalled in the split casing 34 are the gears 37 and 38 meshing with the gears 35 and 36 respectively. The gear 37 contains an axially cut screw thread 39 enclosing a corresponding thread 40 on the rod 41.

The rod 41 has a splined portion 42 engaging with corresponding splines 43 cut axially in the gear 38. The rod 41 extends on the threaded side beyond the split casing to form the lag control rod 33. The split casing is extended on the threaded side to provide a space 44 permitting the threaded portion of the rod 41 to unscrew free of the threaded portion in the gear 37. A spring 45 surrounds the rod 41 within the space 44 and acts to urge the threaded portion 40 of the rod 41 toward the right in Figure 3 and into contact with the threaded portion 39 of the gear 37.

The synchro-drive shaft 32 carries at its other end the corresponding gear 36 in the lag control of the other engine.

Considering the lag drive illustrated in Figure 3 as an independent mechanism, and provided with a right hand thread on the rod 41 and in the gear 37, if the shaft 51 is turned right-handedly the gear 37, with which gear 35 meshes, will turn left-handedly, thus tending to move the right-handedly threaded rod 41 towards the gear 38. The outside diameter of the splines 42 on the rod 41 is not greater than the inside diameter of the thread 39 in the gear 37. Consequently while the splined portion of the rod 41 can withdraw within the thread in the gear 37, the threaded portion of the rod 41 cannot enter the splined bore in the gear 38. It will thus be seen that once contact is established between the end of the thread on the rod 41 and the end of the splines in the gear 38 any further left handed turning of the gear 37 will be directly transmitted to the gear 38 and will result in right-handed turning of the gear 36 and the synchro-drive shaft 32 to which the gear 36 is attached. If, however, the synchro-drive shaft 32 is turned in the same direction as, but more rapidly than, the shaft 51, it may be seen that the difference in rotation between the two drive shafts will result in left-handed rotation of the rod 41 in relation to the threaded bore in the gear 37. This left-handed rotation of the rod 41 will cause it to screw outwardly against the pressure of the spring 45, and if continued will result in the threaded portion of the rod 41 withdrawing completely into the space 44 and clear of the threaded bore in the gear 37.

Further left handed rotation of the rod 41 in relation to the gear 37 can continue indefinitely without further compression of the spring 45, but as soon as the rod 41 commences to rotate right handedly in relation to the gear 37, the pressure of the spring 45 will cause the corresponding threads to re-engage and the rod 41 to move inwardly.

While the governor 26 is actuated by centrifugal force and consequently responds to variations in R. P. M. from one source only, the lag drive depends directly upon the difference in R. P. M. from two sources. Therefore the lag drives are suitable in their basic principle to adjust inaccuracies in synchronization that arise from differences that must exist between even the most accurately matched units.

When the engines 15 are not running at the same speed, i. e. when they are not synchronized, the faster engine drives the synchro-drive shaft 32 through its lag drive 31, and the slower engine causes its lag drive rod 33 to move outwardly, thereby moving the valve 33 to a position in which fluid under pressure is permitted to pass from the pipe 22 to the pipe 24 and thence to the airscrew, thus lowering the pitch of the airscrew blades, relieving the load on the slower engine and permitting it to speed up and synchronize with the other engine.

The lag drive 31 does not affect the connection between the governor and the valve 23 when its engine is the fastest. When, however, one engine lags, its lag drive 31 causes the lag drive rod 33 to move outwardly thus shortening the connection between the governor 26 and the valve 23. In other words, when one engine lags, its lag drive 31 operates to give its governor a bias towards low pitch and consequently increased speed. The lag drive 31 and the governor 26 act co-operatively and not alternatively.

The installation diagrammatically illustrated in Figure 2 is similar to that shown in Figure 1 but utilizes one governor to control the pitch of the blades in both airscrews simultaneously, the lag drive of each engine operating in the same manner as in Figure 1 to adjust the connections between the governor and the control valves to achieve synchronization.

The shaft 32 is divided to provide attachment for the gears 52 from which the single governor 26 is driven. The governor 26 is connected at 55 with levers 54 pivoted at 53. The levers 54 are connected with the rods 30 which are attached to the toggle arms 47 and perform the same function as the connections 30 in Figure 1. The lag drive rods 33 move outwards in the same manner and under the same conditions as the lag drive rods 33 in Figure 1.

*Operation of the mechanism of Figure 2*

In this form of the device the airscrews and their hydraulic control mechanisms are identical with those shown in Figure 1. The difference lies in the fact that both airscrews are controlled by a single governor which, being driven by the shafts 32 through the gears 52, responds to variations in speed of the faster engine. A separate lag drive is provided for each engine which applies a bias to the connections between the governor and the valve 23 of the slower engine, causing its airscrew to decrease pitch, reduce the load on its engine and speed up to achieve synchronization.

To adapt the synchronizing mechanism to installations having more than two engines, it will only be necessary to provide each engine with the mechanism already described as duplicated in the twin engined installation, and to interconnect their synchro-drive shafts for simultaneous rotation. In installations for more than two engines using one governor as illustrated in Figure 2 it will also be necessary to provide control connections from the governor to each of the levers 47.

Figure 6:
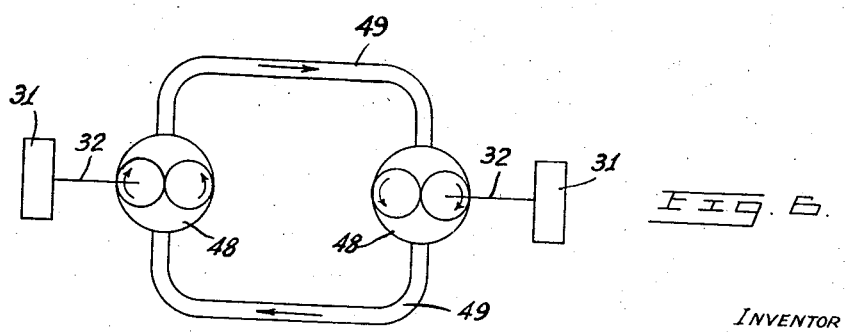
Figure 6 is a diagram showing a hydraulic transmission which may be used in place of the direct rotary drives between the lag controls shown in Figures 1 and 2.

In Figure 6 an alternative form of synchro-drive is illustrated which might be substituted for the synchro-drive shaft 32. This form employs a fluid medium to transmit R. P. M. but any other suitable means of transmission could be employed. The hydraulic gear pumps 48 are driven by the synchro-drive shafts 32, which in this case are quite short, merely forming the connections between the gears 36 and the pumps 48. These gear pumps 48 are connected with each other by the pipe lines 49 thus forming a transmision which can be driven from either end.

With a synchronizing mechanism as above described which responds positively to differences in R. P. M. of the engines, immediate correction of synchronization is achieved regardless of the cause of the disturbance.

While specific mechanisms have been illustrated and described, it will be appreciated that many other mechanical forms could be employed to achieve the same ends without in any way departing from the spirit of this invention as claimed.

What I claim is:

1. In multi-engined aircraft, a lag drive device for each engine, each lag drive comprising a gear driven by the engine, a driven shaft journalled in the lag drive device, a gear mounted on the driven shaft, a pair of gears, each meshing with one of the first mentioned gears, a second shaft splined to rotate with one of said pair of gears and so threaded into the other as to provide a direct drive from the engine to the driven shaft but permitting the driven shaft to overrun the engine causing relative rotation of said pair of gears to produce linear movement of said second shaft, said movement effecting control of the corresponding engine to increase its speed, and a transmission connecting the driven shafts of all the lag drive devices for equal rotation thus causing the fastest engine to drive all said driven shafts.

2. In multi-engined aircraft, a lag drive device for each engine, each lag drive device comprising a casing, a driven shaft journalled in said casing, a pair of gears journalled in said casing one of which is driven by the engine and the other mounted on the driven shaft, a second shaft journalled in said casing and adapted to move laterally therein, said second shaft having a threaded portion and a splined portion, a gear mounted on the splined portion of the shaft and meshing with the gear on the driven shaft, a gear engaging with the threaded portion of the second shaft and meshing with the gear driven by the engine adapted to provide a direct drive from the engine to the driven shaft but permitting the driven shaft to overrun the engine causing rotation in relation to the gear mounted on the splined portion of the second shaft to effect linear movement and through said movement effect control of the engine to increase its speed, and a transmission connecting the driven shafts of all the lag drive devices for equal rotation thus causing the fastest engine to drive all said driven shafts.

3. In multi-engined aircraft, a lag drive device for each engine, each lag drive device comprising a casing, a driven shaft journalled in said casing, a pair of gears journalled in said casing one of which is driven by the engine and the other mounted on the driven shaft, a second shaft journalled in said casing and adapted to move laterally therein, said shaft having a threaded portion and a splined portion, a gear mounted on the splined portion of the shaft for rotation therewith and meshing with the gear on the driven shaft, a gear engaging with the threaded portion of the shaft and meshing with the gear driven by the engine, a spring beyond the threaded portion of the shaft tending to keep that portion in engagement with its gear, the threaded gear adapted to provide a direct drive from the engine to the driven shaft but permitting the driven shaft to overrun the engine causing linear movement of the shaft against the pressure of the spring and through said movement effecting control of the engine to increase its speed, and a transmission connecting the driven shafts of all the lag drive devices for equal rotation thus causing the fastest engine to drive all said driven shafts.

4. In multi-engined aircraft, a lag drive device for each engine, a transmission connecting said lag drive devices, each lag drive comprising, a driven shaft journalled in the lag drive device and connected for equal rotation with all the other driven shafts through the transmission, a pair of gears one of which is driven by the engine the other being mounted on the driven shaft, and means associated with the pair of gears limiting their relative rotation in response to drive from the engine to provide a direct drive from the engine to the driven shaft and permitting the fastest engine to cause, through the transmission, relative rotation of the gears in the opposite direction to effect movement to achieve synchronization.

5. In multi-engined aircraft, a lag drive device for each engine, a transmission connecting said lag drive devices, each lag drive device comprising, a driven shaft journalled in the lag drive device and connected through the transmission with all the other driven shafts, a pair of gears one of which is driven by the engine the other being mounted on the driven shaft, a second pair of gears meshing with one of the first pair of gears, and means associated with said pairs of gears limiting their relative rotation in response to drive from the engine to provide a direct drive from the engine to the driven shaft and permitting the fastest engine to cause, through the transmission, relative rotation of the gears in the opposite direction to effect movement to achieve synchronization.

6. In multi-engined aircraft, a lag drive device for each engine, each lag drive device comprising a casing, a driven shaft journalled in the casing, a pair of gears journalled in the casing one of which is driven by the engine and the other mounted on the driven shaft, a second shaft journalled in said casing and adapted to move laterally therein, said second shaft having a threaded portion and a splined portion, a gear mounted on the splined portion of the shaft and meshing with the gear on the driven shaft, a gear meshing with the gear driven by the engine having an internal thread corresponding to that of the second shaft and threaded thereon, a sleeve extending from said gear forming a recess to receive the threaded portion of the shaft when withdrawn from its gear, a spring within said recess assisting reengagement of said threaded portion, said threaded gear adapted to provide a direct drive from the engine to the driven shaft but permitting the driven shaft to overrun the engine causing relative rotation between the gears mounted on the second shaft to provide linear movement of the second shaft against the pressure of the spring and through said movement effect control of the engine to increase its speed, and a transmission connecting the driven shafts of all the lag drive devices for equal rotation thus causing the fastest engine to drive all said driven shafts.

7. In multi-engined aircraft, means to control the speed of each engine, a synchronizing device associated with each engine, a transmission connecting all the synchronizing devices, each synchronizing device comprising, a member driven by the engine, a second member directly connected with the transmission and connected with the first member through a free wheel device to provide a direct drive from the engine but permitting the second member to overrun the first member, and means to convert such overrunning into movement operating the speed controlling means associated with the engine to increase its speed.

8. In multi-engined aircraft, means to control the speed of each engine, a synchronizing device associated with each engine, a transmission connecting all the synchronizing devices, each synchronizing device comprising, a member driven by the engine, a second member directly connected with the transmission and connected with the first member through a free wheel device to provide a direct drive from the engine but permitting the second member to overrun the first member, means to convert such overrunning into movement operating the speed controlling means associated with the engine to increase its speed, and a transmission connecting the second members of all the synchronizing devices for equal rotation thus causing the fastest engine to drive all said second members.

9. In multi-engined aircraft, means to control the speed of each engine, a governor driven by each engine and regulating its speed through said means, a synchronizing device associated with each engine, a transmission connecting all the synchronizing devices, each synchronizing device comprising, a member driven by the engine, a second member directly connected with the transmission and connected with the first member through a free wheel device to provide a direct drive from the engine but permitting the second member to overrun the first member, means to convert such overrunning into movement operating the speed controlling means associated with the engine to increase its speed, and a transmission connecting the second members of all the synchronizing devices for equal rotation thus causing the fastest engine to drive all said second members.

10. In multi-engined aircraft, means to control the speed of each engine, a synchronizing device associated with each engine, a transmission connecting all the synchronizing devices, each synchronizing device comprising, a member driven by the engine, a second member directly connected with the transmission and connected with the first member through a free wheel device to provide a direct drive from the engine but permitting the second member to overrun the first member, means to convert such overrunning into movement operating the speed controlling means associated with the engine to increase its speed, a transmission connecting the second members of all the synchronizing devices for equal rotation thus causing the fastest engine to drive all said second members, and a governor driven by said transmission regulating the speed of all the engines through the speed controlling means.

11. In multi-engined aircraft, means to control the speed of each engine, a synchronizing device associated with each engine, a transmission connecting all the synchronizing devices, each synchronizing device comprising, a member driven by the engine, a second member directly connected with the transmission and connected with the first member through a free wheel device to provide a direct drive from the engine but permitting the second member to overrun the first member, means to convert such overrunning into movement operating the speed controlling means associated with the engine to increase its speed, and means permitting the second member to continue to overrun the first member after the synchronizing device has been actuated to its fullest extent.

GRETTIR ALGARSSON.